United States Patent
Katayama

(10) Patent No.: US 6,349,321 B1
(45) Date of Patent: Feb. 19, 2002

(54) DATA PROCESSING SYSTEM AND SCHEDULING METHOD

(75) Inventor: Isao Katayama, Tokyo (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/067,900

(22) Filed: Apr. 29, 1998

(30) Foreign Application Priority Data

Apr. 30, 1997 (JP) .............................................. 9-112825

(51) Int. Cl.⁷ ................................................ G06F 9/00
(52) U.S. Cl. ....................................... 709/103; 709/102
(58) Field of Search ................................ 709/100–108; 700/95

(56) References Cited

U.S. PATENT DOCUMENTS

| | | | | |
|---|---|---|---|---|
| 5,379,428 A | * | 1/1995 | Belo ........................... | 709/103 |
| 5,386,561 A | * | 1/1995 | Huynh et al. ................ | 709/103 |
| 5,515,538 A | * | 5/1996 | Kleiman ...................... | 710/260 |
| 5,949,994 A | * | 9/1999 | Dupree et al. ............... | 712/228 |
| 5,963,721 A | * | 10/1999 | Shiell et al. .................. | 710/129 |
| 6,006,247 A | * | 12/1999 | Browning et al. ........... | 709/102 |

OTHER PUBLICATIONS

Schwan Et Al. "DYNAMIC SCHEDULING OF HARD REAL–TIME TASKS AND REAL–TIME THREADS.", IEEE, 1992.*

Chung Et Al. "ALGORITHMS FOR SCHEDULING IMPRECISE COMPUTATIONS", IEEE, 1991.*

Xu Et Al. "SCHEDULING PROCESSES WITH RELEASE TIMES, DEADLINES, PRECEDENCE, AND EXCLUSION RELATIONS", IEEE, 1990.*

* cited by examiner

Primary Examiner—St. John Courtenay, III
Assistant Examiner—Van Hoa Nguyen
(74) Attorney, Agent, or Firm—Foley & Lardner

(57) ABSTRACT

A central processing unit schedules the start time of a following special process based on the progress status of a preceding special process being executed in an auxiliary processing unit and the processing time and the end time of the following special process.

11 Claims, 12 Drawing Sheets

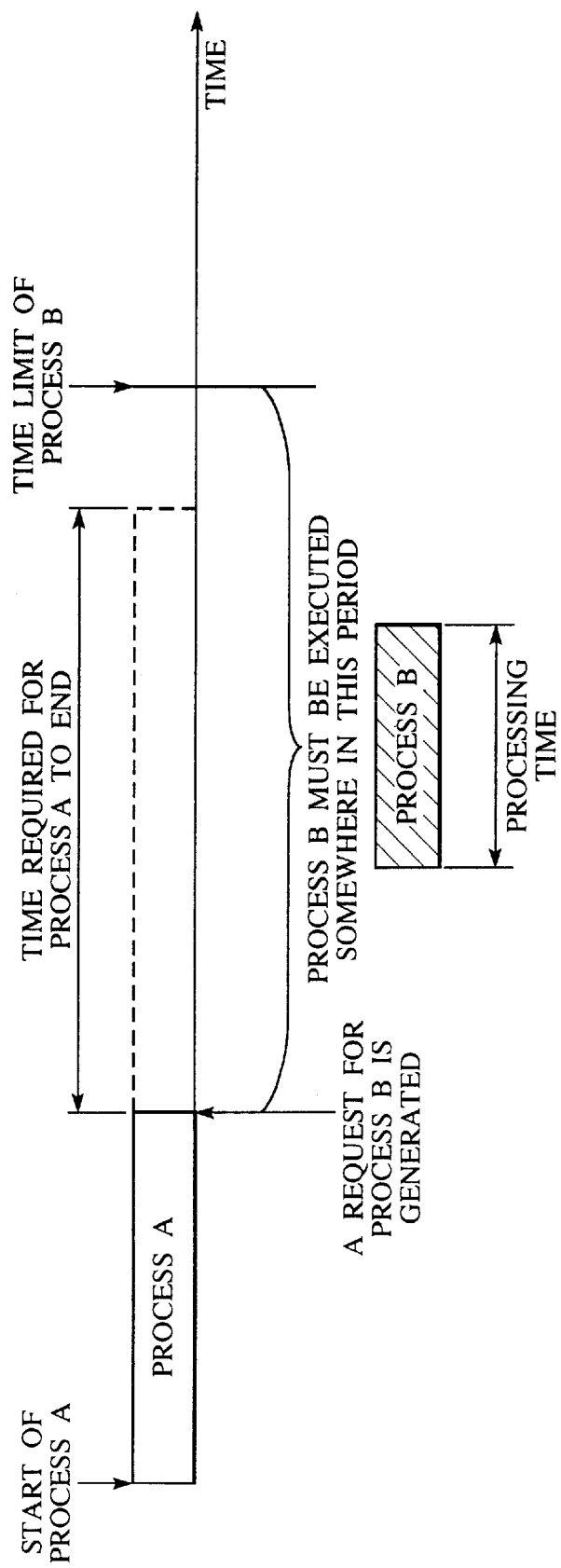

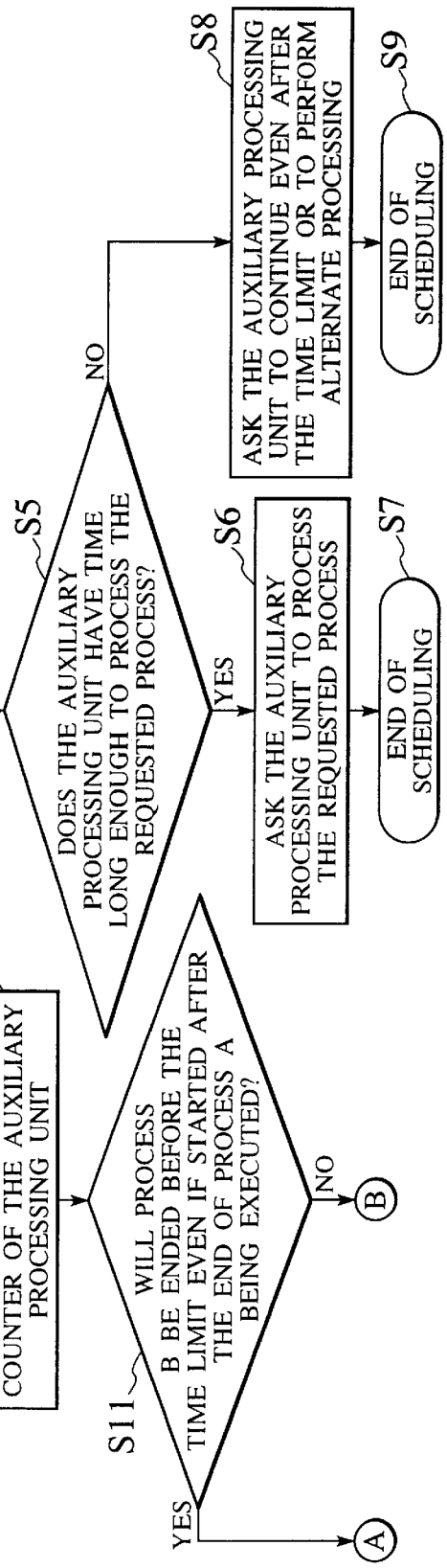

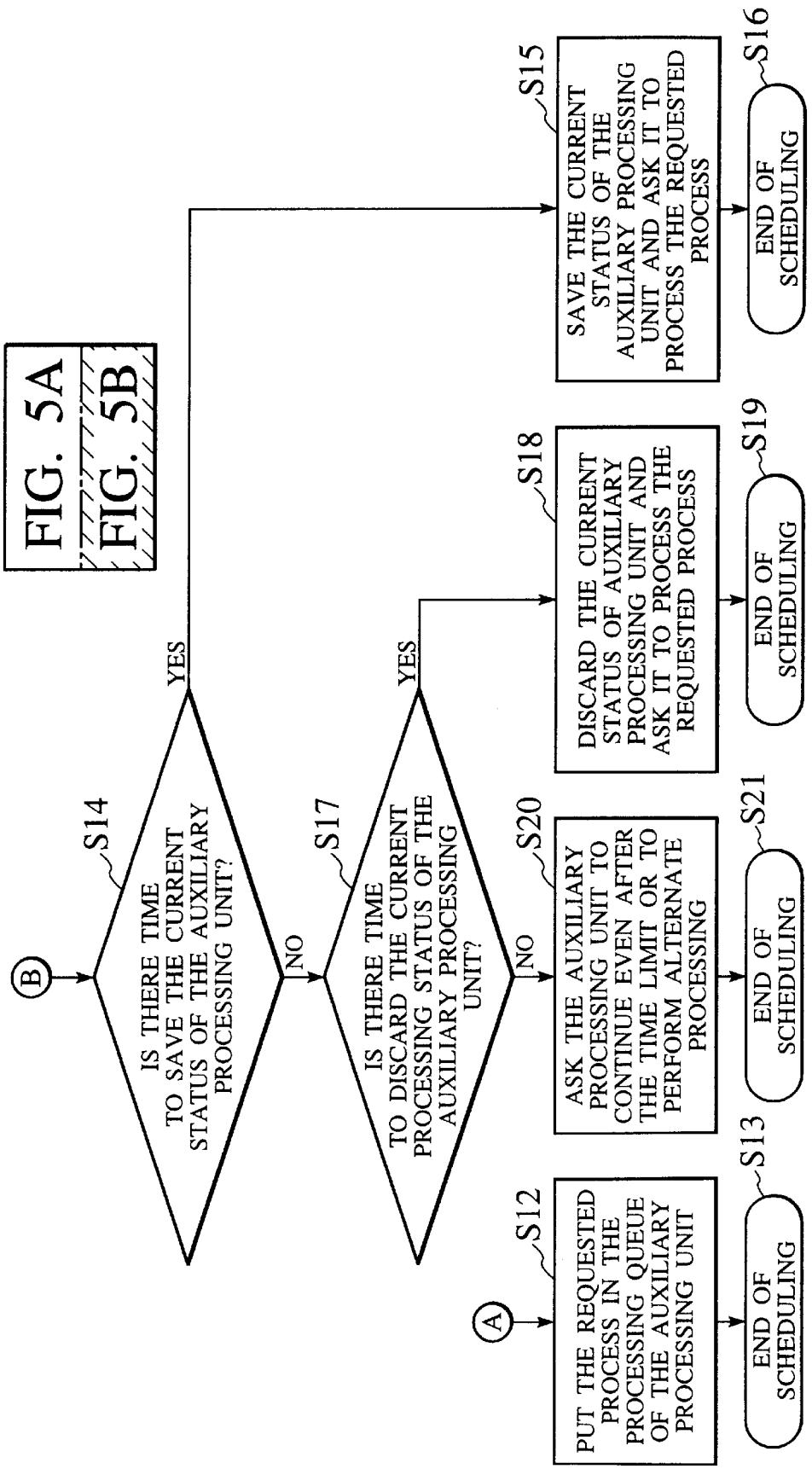

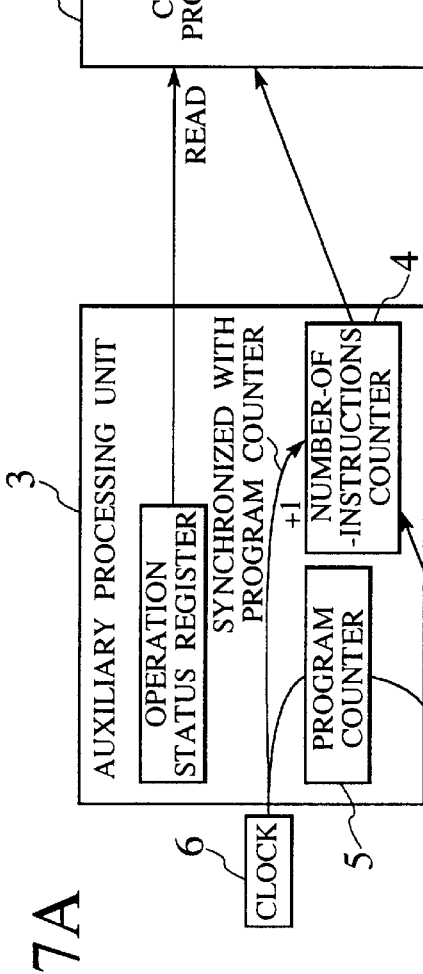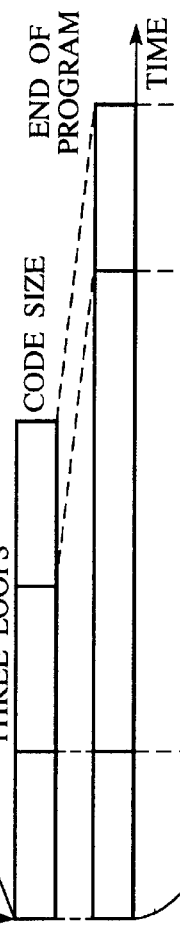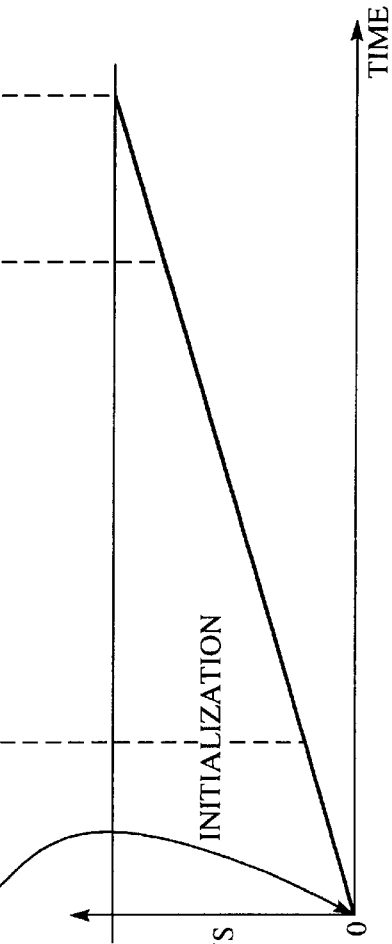

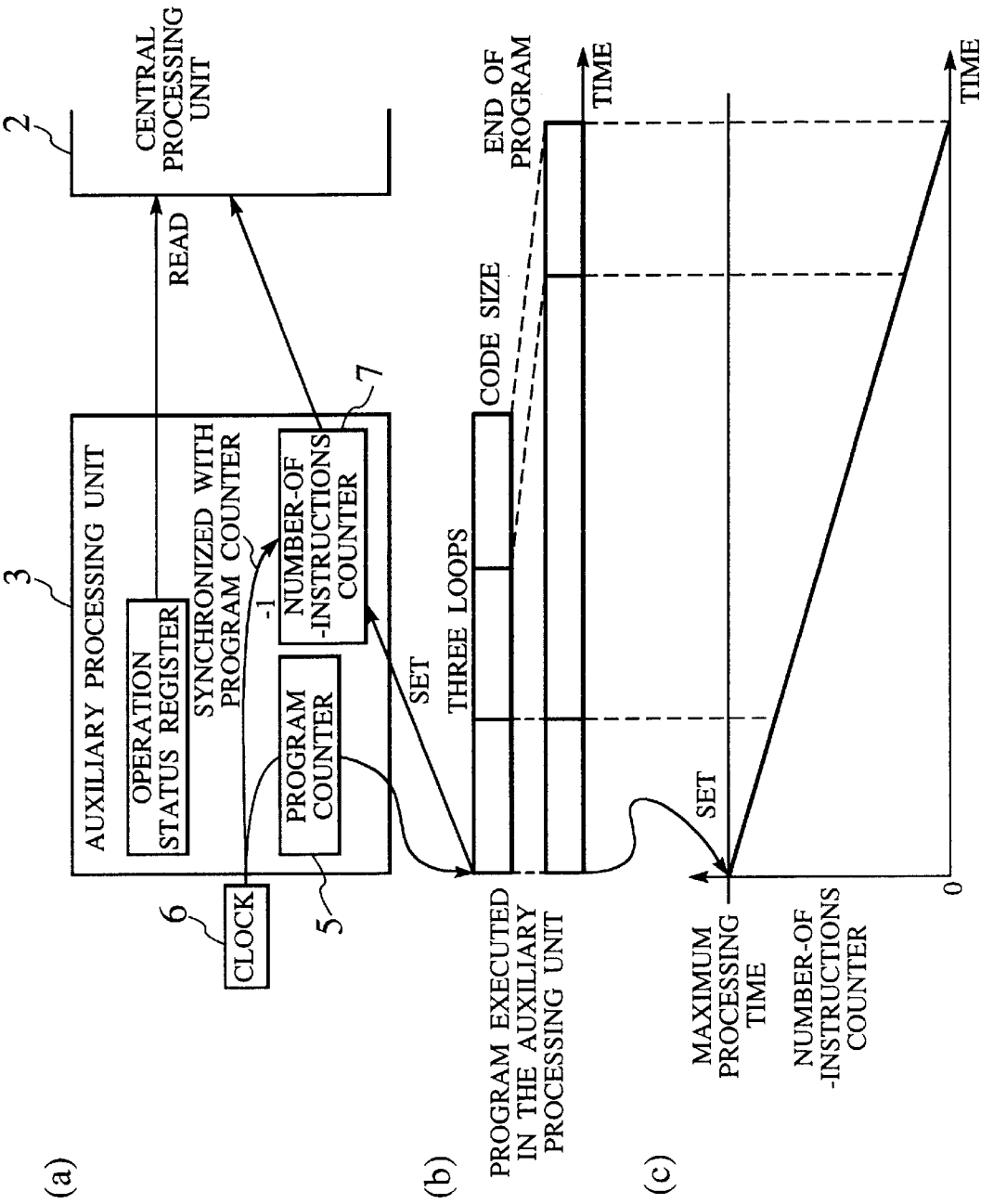

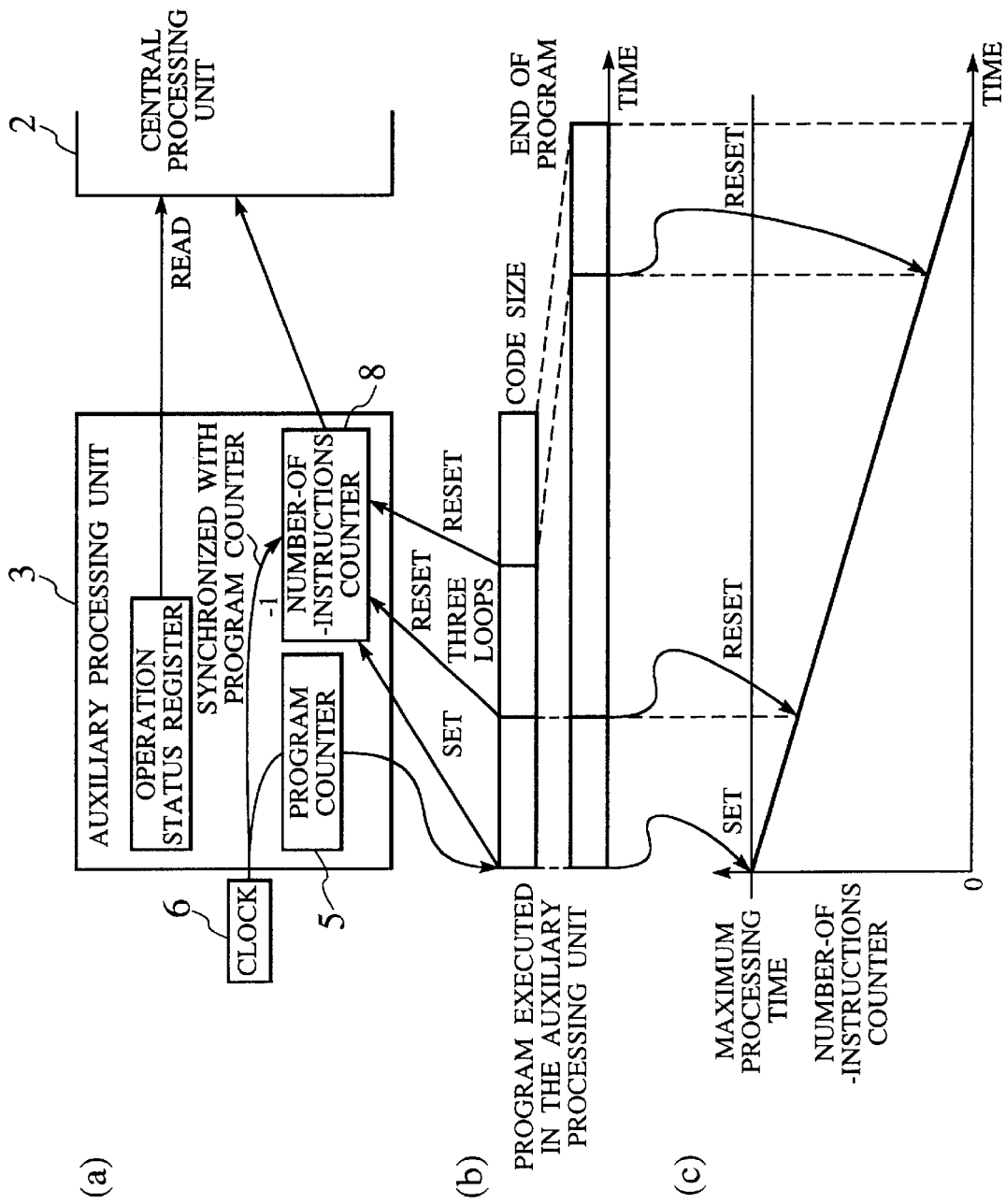

DATA PROCESSING SYSTEM AND SCHEDULING METHOD

BACKGROUND OF THE INVENTION

1. Field of the Invention

This invention relates to a data processing system and a scheduling method which, for use in a data processing system composed of a central processing unit and an auxiliary processing unit provided in, and running in parallel with, the central processing unit, allow the central processing unit to schedule processes to be executed in an auxiliary processing unit so that the auxiliary processing unit may perform special processing efficiently.

2. Description of the Related Art

Recently, a need has arisen to process multimedia data, including voice data, image data, and communication data, through software. Because multimedia processing involves a large amount of data which must be processed at a high speed and in parallel, the central processing unit contains, in many cases, an auxiliary processing unit specifically designed to perform multimedia processing in parallel with the central processing unit. In such a configuration, the central processing unit is responsible for controlling the system and scheduling jobs to enable the auxiliary processing unit to efficiently perform multimedia processing within a limited time, while the auxiliary processing unit performs only specified multimedia processing according to schedules arranged by the central processing unit.

Two or more multimedia processes, each of which requires a long time, must usually be processed in parallel. However, depending upon the status of the auxiliary processing unit, performing such multimedia processes in the above-described configuration sometimes results in parallel processing not being performed smoothly and, in the worst case, intended processing not being completed within the time limit. A typical example of this problem is that a time-critical, high-priority multimedia process must be executed while a low-priority multimedia process is being executed. In this case, the central processing unit of a conventional system has used one of the following methods to schedule the auxiliary processing unit:

(1) Interrupts the current processing of the auxiliary processing unit and saves the status of the processing. For example, the central processing unit saves the data stored in all registers. Then, the auxiliary processing unit executes the higher-priority process, restores the saved status data when the higher-priority process ends, and restarts the interrupted process.

(2) Stops the current processing executed by the auxiliary processing unit, discards all status data, and executes the higher-priority process. When the processing of the higher-priority process ends, the central processing unit restarts the discarded process from the beginning or, instead of restarting the discarded process from the beginning, cancels the process and executes some alternate processing.

(3) Waits for the auxiliary processing unit to end the current processing and then executes the next process.

The scheduling method described in (1) is commonly used in usual multiprocessing. However, because standard multimedia processes usually use many registers, this method sometimes takes long in saving and restoring them. The scheduling method described in (2) is sometimes used in multimedia processing. Because discarding status data requires much less time than saving it, this method has an advantage over the scheduling method described in (1) in that processes are switched quickly. In addition, alternate processing, if done optimally, reduces the overall system load. The scheduling method described in (3) is useful when, instead of saving or discarding the current process status data and then switching processes, completing the current process results in the high-priority process being executed more quickly. Depending upon the status of the process in execution, this method is more efficient.

Using these scheduling methods to flexibly schedule the auxiliary processing unit which performs multimedia processing increases overall system efficiency. However, the conventional auxiliary processing unit has no means for reporting the progress status of the current process to the central processing unit. Thus, when the auxiliary processing unit need to process a high-priority multimedia process during execution of a low-priority multimedia process, the central processing unit has no way to determine which of the above-described scheduling methods will be best to complete the high-priority multimedia process within the time limit without increasing the overall system load. The central processing unit of the conventional system has selected either scheduling method (1) or (2) to schedule any multimedia process it receives.

Assume that the scheduling method (1) is used. In the example shown in FIG. 1A, process A currently in execution is interrupted, the status data is saved, and process B which follows process A is executed and is completed within the time limit. In the example shown in FIG. 1B, there is no time to save the status of process A and therefore process B cannot be completed within the time limit. In the example shown in FIG. 1C, process B is completed within the time limit. However, process B may also be completed even if it is executed after process A. Moreover, the status must be restored after termination of process B to restart process A. Therefore, the scheduling method is inefficient in this case because scheduling involves meaningless process switching with an increase in the amount of overall system processing.

Assume that the scheduling method (2) is used. In the example shown in FIG. 2A, process A currently in execution is interrupted, the status data is discarded, and process B that follows is executed and is completed within the time limit of process B. However, because process A must be executed from the beginning in this case after process B is ended, the total amount of processing becomes very large. In the example shown in FIG. 2B, there is no time to save the status of process A. So, process A must be restarted from the beginning in order to end higher-priority process B within the time limit. On the other hand, the example shown in FIG. 2C is inefficient because it is similar to the one shown in FIG. 1C. The need to execute process A from the beginning involves meaningless process switching with an increase in the amount of overall system processing.

As described above, the central processing unit in the conventional data processing system, in which the auxiliary processing unit is provided to execute multimedia processing and so forth according to the schedule arranged by the central processing unit, cannot keep track of the progress status of a process the auxiliary processing unit is currently executing. Therefore, the central processing unit selects one of a plurality of scheduling methods and, according to the selected scheduling method, schedules the processes the auxiliary processing unit is going to execute. This prevents optimized scheduling and so prevents the auxiliary processing unit from executing processing efficiently.

SUMMARY OF THE INVENTION

In view of the foregoing, it is an object of this invention to provide a data processing system and a scheduling method which optimally schedule special processes to be executed by the auxiliary processing unit according to a schedule arranged by the central processing unit in order to allow the auxiliary processing unit to execute special processes efficiently.

To achieve the above object, there is provided a data processing system comprising a central processing unit; an auxiliary processing unit which runs in parallel with the central processing unit and which executes a special process according to a schedule made by the central processing unit, wherein the auxiliary processing unit comprises progress status indicating means for indicating a progress status of the special process being executed therein; and operation status indicating means for indicating an operation status thereof, and wherein the central processing unit comprises a database which stores a predetermined execution processing time of each special process; and scheduling means, responsive to a new process request received when the operation status indicating means indicates that a preceding special process is being executed in the auxiliary processing unit and the new special process is higher in priority than the preceding special process, for selecting any one of ending the preceding special process, interrupting the preceding special process and saving a processing status, and interrupting the preceding special process and discarding the processing status, based on a limit time from the moment the new process request is received to the moment the new special process must be ended, the processing time of the new special process, the processing time being stored in the database, a time required for the preceding special process to end, the time being obtained by referencing the progress status indicating means of the auxiliary processing unit, and a time required to interrupt the preceding special process being executed in the auxiliary processing unit and to save or discard the processing status, and then for scheduling a time at which the new special process is to start.

To achieve the above object, there is provided a data processing system comprising a central processing unit; and an auxiliary processing unit which runs in parallel with the central processing unit and which executes a special process according to a schedule made by the central processing unit, wherein the auxiliary processing unit comprises progress status indicating means for indicating a progress status of the special process being executed therein; and operation status indicating means for indicating an operation status thereof, and wherein the central processing unit comprises a database which stores a predetermined execution processing time of each special process; and scheduling means, responsive to a request received when the operation status indicating means indicates that a preceding special process is being executed in the auxiliary processing unit and the new special process is higher in priority than the preceding special process, for calculating a limit time, Ta, from the moment the new process request is received to the moment the new special process must be ended, retrieving the processing time, Tb, of the new special process from the database, calculating a latest start time, Tc, before which the new special process must be started to complete within the limit time by subtracting the processing time Tb from the limit time Ta, and calculating a time, Td, when the preceding special process is to end by referencing the progress status indicating means of the auxiliary processing unit, wherein the new special process is scheduled to start after the preceding special process is ended if Tc$\geq$Td, wherein the preceding special process is interrupted, the processing status is saved, and then the new special process is scheduled to start if Tc<Td and Tc$\geq$Te, and wherein the preceding special process is interrupted, the processing status is discarded, and then new special process is scheduled to start if Tc<Td, Tc<Te, and Tc$\geq$Tf, Te being a time at which the processing status of the interrupted preceding special process in the auxiliary processing unit is saved, Tf being a time at which the processing status of the interrupted preceding special process in the auxiliary processing unit is discarded.

In a preferred embodiment of this invention, the progress status indicating means is initialized to 0 when the special process is started and comprises a counter which is incremented by the number of instructions executed as the special process progresses.

In a preferred embodiment of this invention, the progress status indicating means is set to the time required to execute the special process when the auxiliary processing unit starts the special process, and comprises a counter which is decremented by the number of instructions executed as the special process progresses.

In a preferred embodiment of this invention, the value of the counter is reset according to the content of processing at any time during the special processing.

To achieve the above object, there is provided a scheduling method for allowing a central processing unit to schedule special processes to be executed in an auxiliary processing unit, in response to a new special process request received by the central processing unit when a preceding special process is being executed in the auxiliary processing unit and the new special process is higher in priority than the preceding special process, comprising the steps of selecting any one of ending the preceding special process, interrupting the preceding special process and saving a processing status, and interrupting the preceding special process and discarding the processing status, based on a limit time from the moment the new process request is received to the moment the new special process must be ended, a processing time of the new special process, a time from the moment the request is received to the moment the preceding special process is to end; and a time required to interrupt the preceding special process being executed in the auxiliary processing unit and to save or discard the processing status; and scheduling a time at which the new special process is to start.

To achieve the above object, there is provided a scheduling method for allowing a central processing unit to schedule special processes to be executed in an auxiliary processing unit, in response to a new special process request received by the central processing unit when a preceding special process is being executed in the auxiliary processing unit and the new special process is higher in priority than the preceding special process, comprising the steps of calculating a limit time, Ta, from the moment the new process request is received to the moment the new special process must be ended; retrieving a processing time, Tb, of the new special process and calculating a latest start time, Tc, before which the new special process must be started to complete within the limit time by subtracting the processing time Tb from the limit time Ta; calculating a time, Td, when the preceding special process is to end; starting the new special process after the preceding special process is ended if Tc$\geq$Td; interrupting the preceding special process, saving the processing status, and then starting the new special process if Tc<Td and Tc$\geq$Te, Te being a time at which the processing status of the interrupted preceding special process in the auxiliary processing unit is saved; and interrupting the preceding special process, discarding the processing status, and then starting the new special process if Tc<Td, Tc<Te, and Tc$\geq$Tf, Tf being a time at which the processing status of the interrupted preceding special process in the auxiliary processing unit is discarded.

The nature, principle and utility of the invention will become more apparent from the following detailed description when read in conjunction with the accompanying drawings.

BRIEF DESCRIPTION OF THE DRAWINGS

In the accompanying drawings:

FIG. 4 is a diagram showing the operation status of the auxiliary processing unit show in FIG. 3;

FIGS. 5A and 5B are flowcharts showing how processes are scheduled by an embodiment according to this invention;

FIGS. 7A to 7C are diagrams showing the configuration and the operation of a number-of-instructions counter used in an embodiment according to this invention;

FIG. 8 is a diagram showing the configuration and the operation of a number-of-instructions counter used in an embodiment according to this invention;

FIG. 9 is a diagram showing the configuration and the operation of a number-of-instructions counter used in an embodiment according to this invention.

DESCRIPTION OF THE PREFERRED EMBODIMENTS

A preferred embodiment of this invention is described below with reference to the drawings.

Figure 1A:
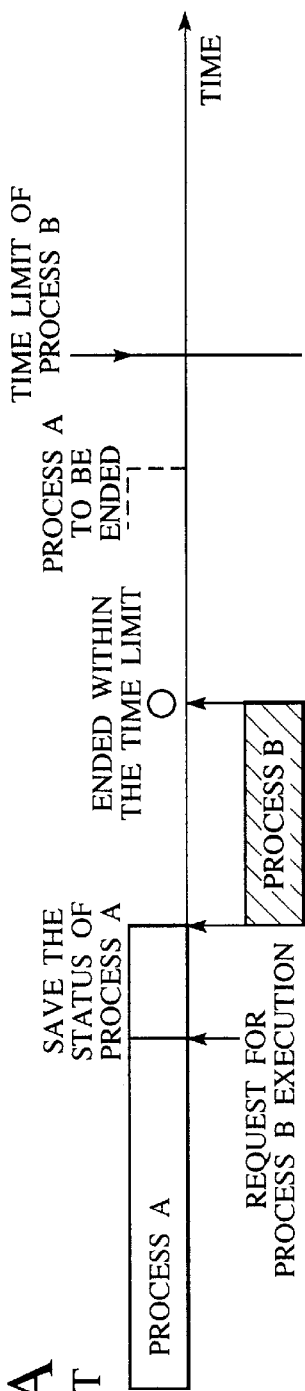
FIGS. 1A to 1C are diagrams showing how the status of a preceding process is saved and then the following process is executed.
Figure 1B:
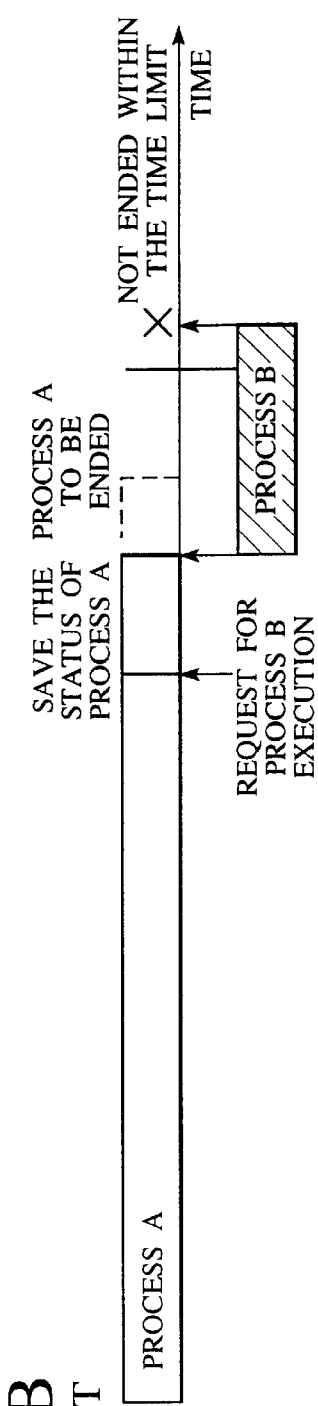
Figure 1C:
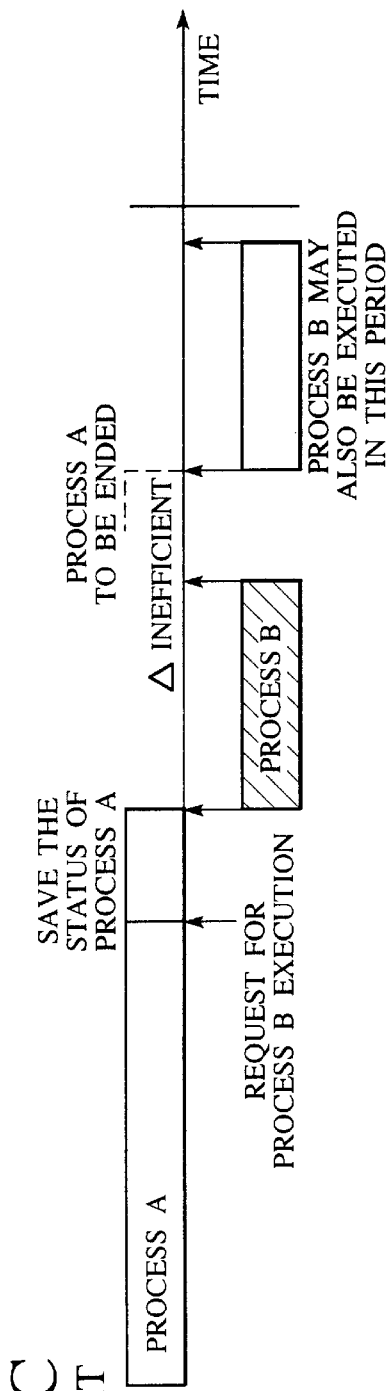
Figure 2A:
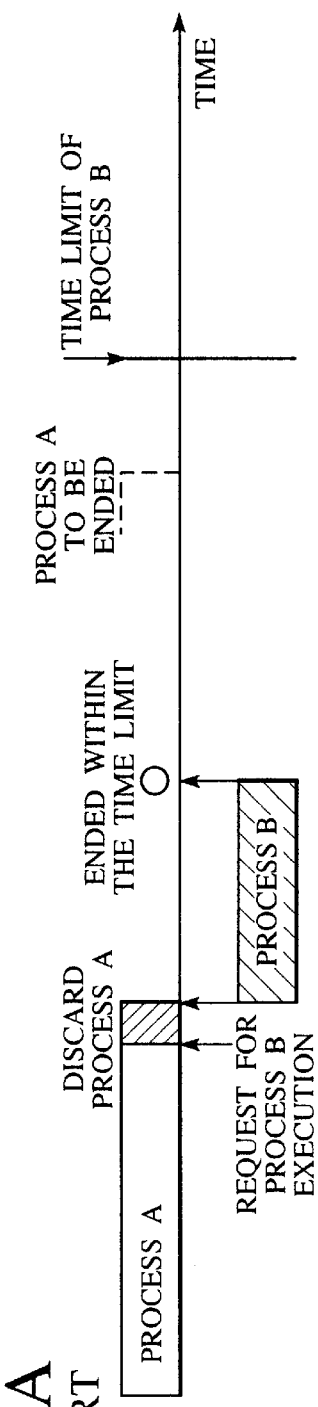
FIGS. 2A to 2C are diagrams showing how the status of a preceding process is discarded and then the following process is executed.
Figure 2B:
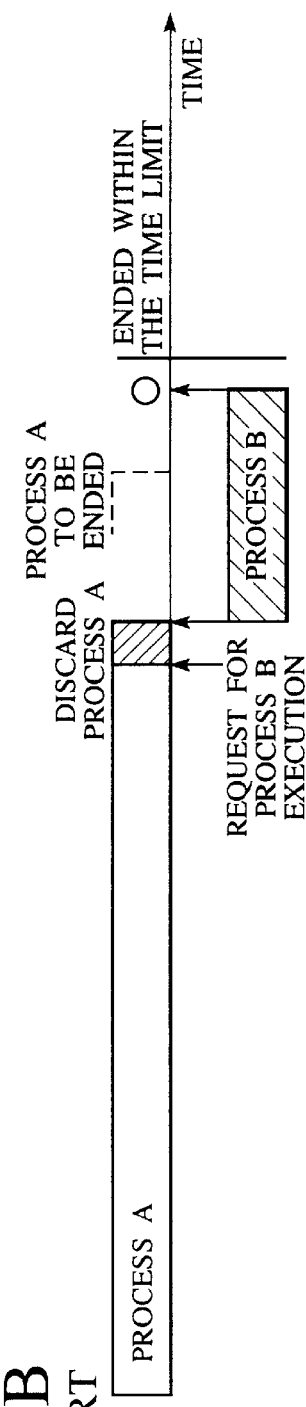
Figure 2C:
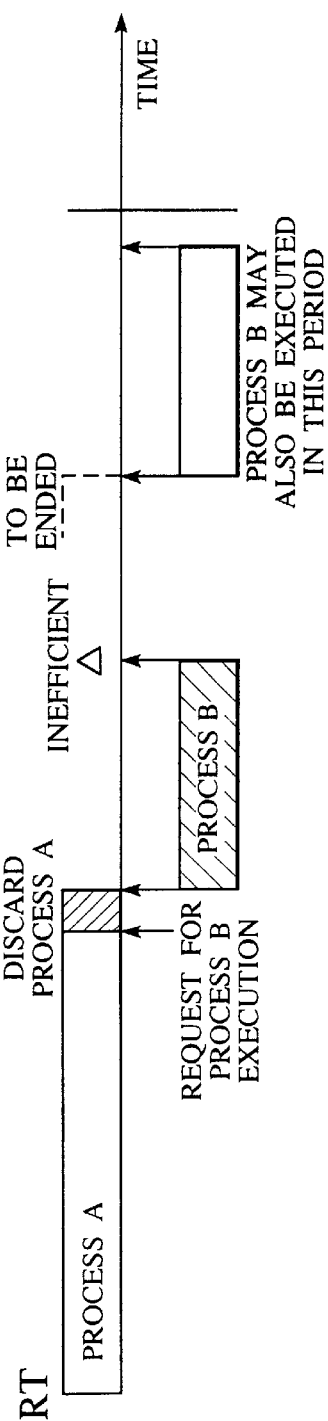
Figure 3:
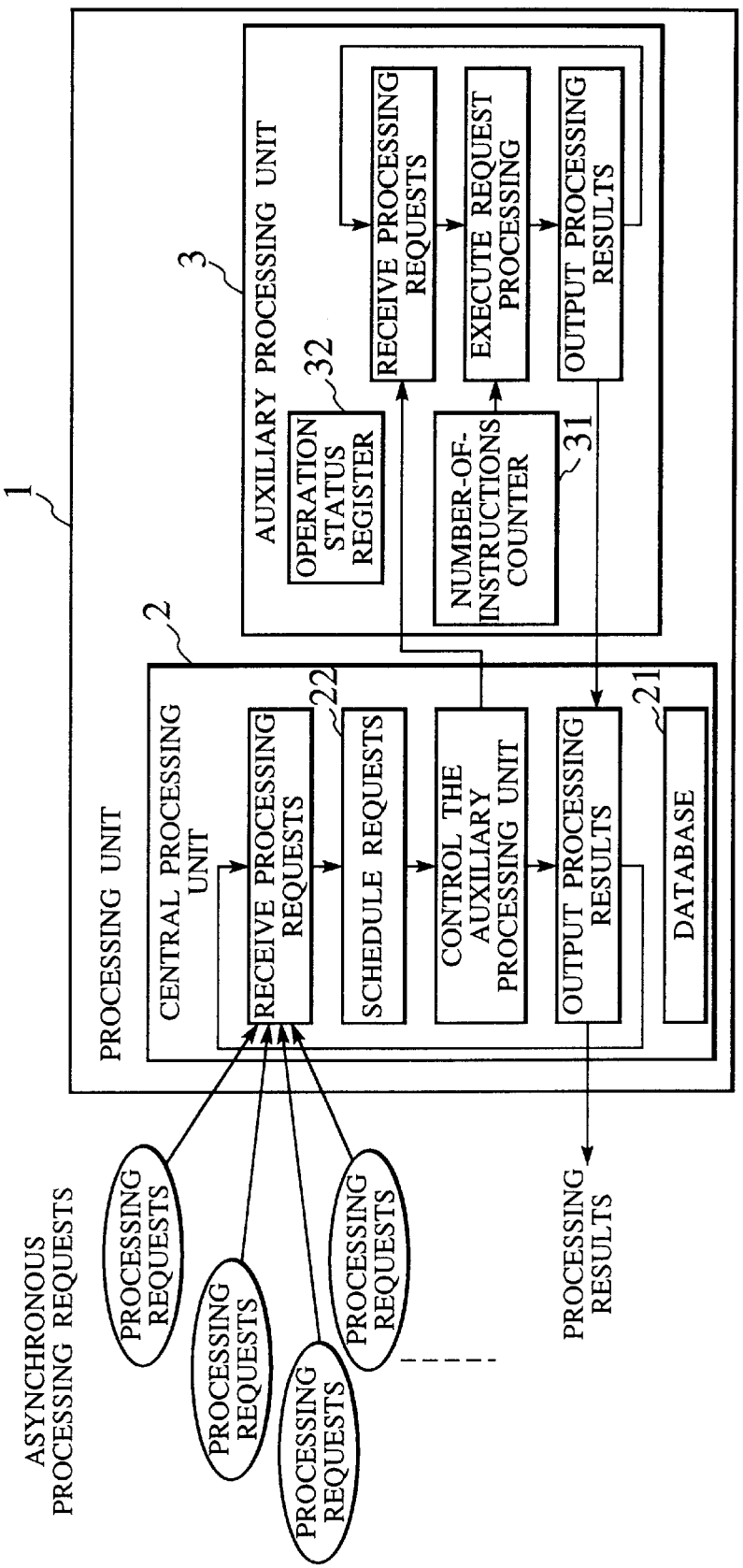
FIG. 3 is a diagram showing the configuration of a data processing system of an embodiment according to this invention.

FIG. 3 is a diagram showing the configuration of a data processing system of the embodiment according to this invention.

As shown in FIG. 3, a data processing system 1 comprises a central processing unit 2 and an auxiliary processing unit 3 which runs in parallel with the central processing unit 2 and which performs special processes, such as multimedia processes, according to a schedule made by the central processing unit 2. The auxiliary processing unit 3 comprises a number-of-instructions counter 31 which is a means for indicating the progress status of a special process currently in execution and an operation status register 32 which is a means for indicating the operation status of the auxiliary processing unit 3. The central processing unit 2 comprises a database 21 which contains the pre-calculated execution times of multimedia processes and a scheduling means 22 which, upon receiving a multimedia process (following multimedia processing) request with a priority higher than that of a multimedia process (preceding multimedia processing) being executed in the auxiliary processing unit 3, schedules a time the following multimedia process is to start. Upon receiving a following multimedia process request with a priority higher than that of a preceding multimedia process request, the scheduling means 22 calculates a limit time Ta from the moment the following multimedia process request is received to the moment the following multimedia process must be ended, retrieves a processing time Tb of the following multimedia process request from the database 21, subtracts the processing time Tb from the limit time Ta to find a latest start time Tc before which the following multimedia process request must be started at the latest in order to end it before the limit time, checks the operation status register of the auxiliary processing unit 3 and, if the register indicates that the auxiliary processing unit 3 is executing some other multimedia process at that time, checks the number-of-instructions counter of the auxiliary processing unit 3 to find a time Td at which the preceding multimedia process is to end and, if $Tc \geq Td$, starts the following multimedia process request after the end of preceding multimedia process and if $Tc<Td$ and $Tc \geq Te$, interrupts the preceding multimedia process, saves the processing status and then starts following multimedia process and, if $Tc<Td$, $Tc<Te$, and $Tc \geq Tf$, interrupts the preceding multimedia process, discards the processing status, and starts the following multimedia process, where Te is a time at which saving the processing status will be ended after interrupting the multimedia process being executed in the auxiliary processing unit 3 and Tf is a time at which discarding the processing status will be ended after interrupting the multimedia process being executed in the auxiliary processing unit 3.

The central processing unit 2 receives a plurality of asynchronous processing requests from external or internal tasks, schedules the requests, asks the auxiliary processing unit 3 to process them, receives the results, and then outputs the results to external units or passes them to internal tasks. Under this condition, assume that, during execution of process A (preceding multimedia processing) in the auxiliary processing unit 3, process B which has a priority higher than that of process A is generated externally as shown in FIG. 4. In such a case, the central processing unit 2 receives a processing request for process B from an external unit, schedules it, and asks the auxiliary processing unit 3 to process it. Because the number-of-instructions counter in the auxiliary processing unit 3 indicates how long it will take to complete the process being executed in the auxiliary processing unit 3, the central processing unit 2 schedules following multimedia process according to the flowchart shown in FIGS. 5A and 5B.

The following explains the scheduling procedure with reference to FIGS. 5A and 5B.

First, upon receiving from an external unit a request for process B which will use the auxiliary processing unit 3 (step S1), the central processing unit 2 checks what will be executed and calculates the time limit before which process B must be ended (step S2). Next, the central processing unit 2 gets the processing time of process B from the database in which the longest execution times of processes are stored, and calculates the latest start time by subtracting the processing time of process B from the time limit calculated in step S2 (step S3). If the auxiliary processing unit 3 is idle and has time long enough to process B, the central processing unit 2 asks the auxiliary processing unit 3 to process process B and ends scheduling (steps, S4, S5, S6, and S7). If the auxiliary processing unit 3 is idle but has no time to process process B, the central processing unit 2 asks the auxiliary processing unit 3 to process process B even if the time limit is exceeded or to perform alternate processing and ends scheduling (steps S8 and S9).

On the other hand, if the auxiliary processing unit 3 is executing another process, process A, the central processing unit 2 gets the contents of the number-of-instructions counter 31 of the auxiliary processing unit 3 to find the end time of process (step S10). If it is found that process B, even if started after the end of process A, will be ended before the time limit, the central processing unit 2 puts the request for process B in the processing queue of the auxiliary processing unit 3 and ends scheduling (steps S11, S12, and S13). If process A has to be suspended because it is found that process B, if executed after the end of process A, will not be ended within the time limit, and if there is time long enough to save the status of process A currently being executed, the central processing unit 2 saves the status of process A, asks the auxiliary processing unit 3 to execute process B, and ends scheduling (steps S11, S14, S15, and S16). Next, if it is found that there is no time to save the status of process A which is being executed but there is time to discard process A, the central processing unit 2 discards process A, asks the auxiliary processing unit 3 to start process B, and ends scheduling (steps S14, S17, S18, and S19). If it is found that process B will not be ended within the time limit even if process A is discarded and process B is started immediately, the central processing unit 2 asks the auxiliary processing unit 3 to execute process B even if the time limit is exceeded or to perform alternate processing (steps S17, S20, and S21).

Figure 6A:
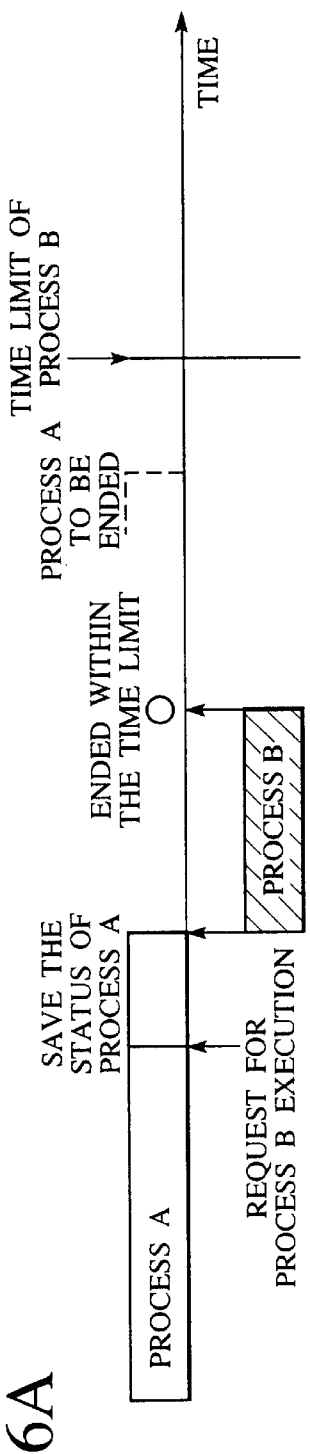
FIGS. 6A to 6C are diagrams showing the process flow of the data processing system shown in FIG. 3.
Figure 6B:
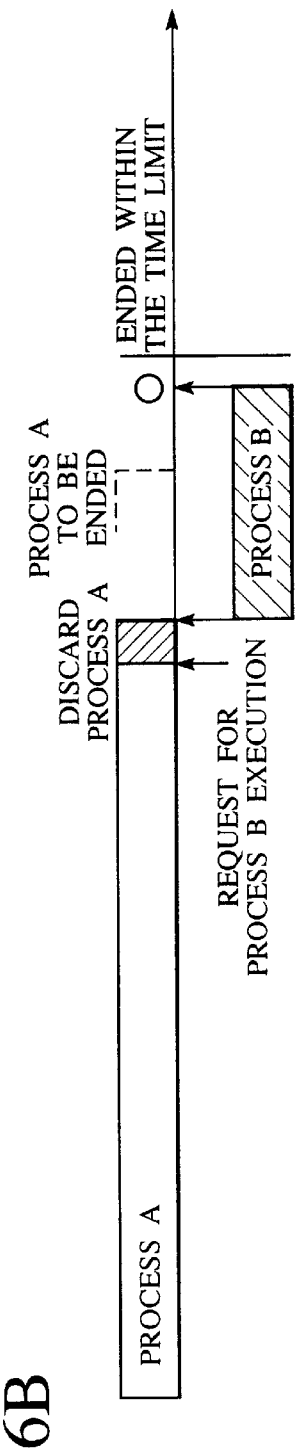
Figure 6C:
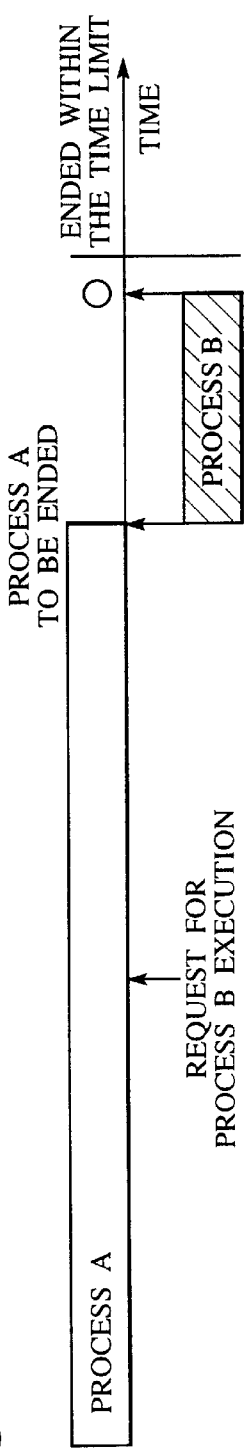

This scheduling method has the following advantages. For example, if it is found that the following process B will be ended before the limit time even if started after the end of the preceding process A as shown in FIG. 6C, this scheduling method eliminates the need for the switch from process A to process B (such as saving or discarding the status of process A), which is needed in the conventional system where processes are scheduled in a fixed manner, while allowing process B to end within the time limit, thus minimizing the amount of processing. In addition, if there is time to save the status of process A as shown in FIG. 6A, this scheduling method saves the status of process A to allow it to be restarted, with the use of saved status, from the point of interruption. This results in a less amount of processing than when process A is started from the beginning, enabling process A to end sooner. When the limit time of process B is very near as shown in FIG. 6B, this scheduling method discards the status of process A and immediately starts process B to end it before the limit time. In this way, this scheduling method schedules the start time of process B by considering the progress status of the preceding process A, the processing time of the following process B, and the time limit of processing. Therefore, this scheduling method makes it possible to process the following process much more efficiently than with the conventional method which schedules processes in a fixed manner, thus reducing the processing amount and processing time.

Next, the number-of-instruction counter is described with reference to FIGS. 7, 8, 9, 10A, and 10B.

FIG. 7 is a diagram showing the configuration and the operation of the number-of-instructions counter of an embodiment according to this invention. As shown in (a) of FIG. 7, the auxiliary processing unit 3 has a number-of-instructions counter 4 which may be read from the central processing unit 2. The number-of-instructions counter 4 is connected to a system clock 6 of the auxiliary processing unit 3 such that the counter is incremented by 1 each time a program counter 5 changes. Part (b) of FIG. 7 shows a program to be executed in the auxiliary processing unit 3 with the code size or the processing time as its parameter. Assume that the program shown in the figure has three internal loops and that, for convenience, the program execution time is proportional to the amount of program code. Part (c) of FIG. 7 shows how the number-of-instructions counter 4 increases as the program in (b) of FIG. 7 runs. The number-of-instructions counter 4 is initialized to 0 by the auxiliary processing unit 3 when the program starts, and is increased as the program progresses. Because each process has its own maximum value of the counter, the scheduling means of the central processing unit 2 checks the difference between the maximum value and the current value to estimate the remaining amount of processing the auxiliary processing unit 3 will have to do.

FIG. 8 is a diagram showing the configuration and the operation of the number-of-instructions counter of an embodiment according to this invention. A number-of-instructions counter 7 in (a) of FIG. 8 differs in initialization and operation from the number-of-instructions counter 4 used in the embodiment shown in FIG. 7. In this embodiment, the pre-determined maximum multimedia processing amount is stored in the number-of-instructions counter 7 at execution start time and, as shown in (b) and (c) of FIG. 8, it is decremented by 1 each time an instruction of the program in the auxiliary processing unit 3 is executed. In this case, the number-of-instructions counter 7 always indicates the remaining amount of processing. The scheduling means of the central processing unit 2 checks the value of this counter to estimate the remaining amount of processing the auxiliary processing unit 3 will have to do.

Figure 10A:
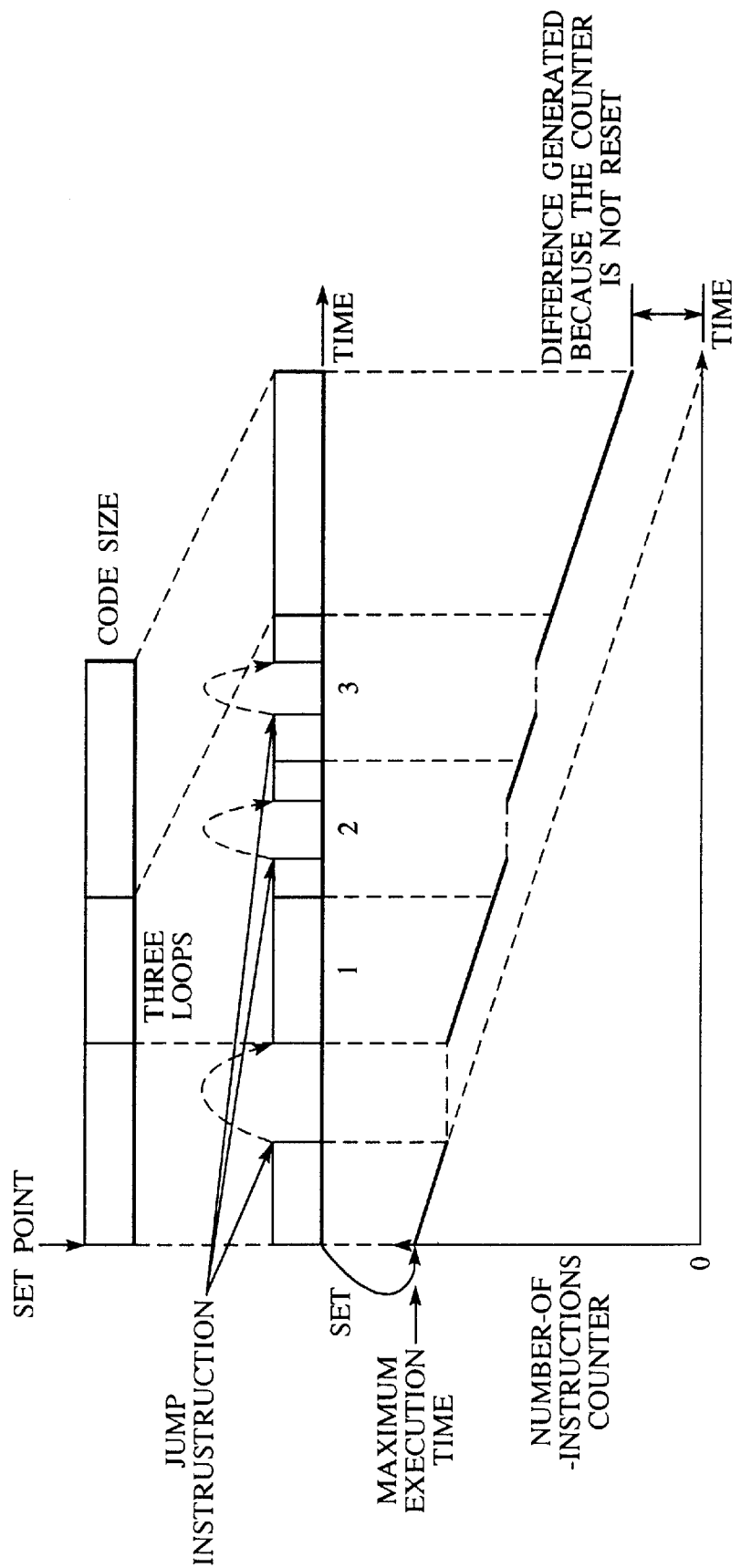
FIGS. 10A and 10B are diagrams showing the configuration and the operation of a number-of-instructions counter used in an embodiment according to this invention.
Figure 10B:
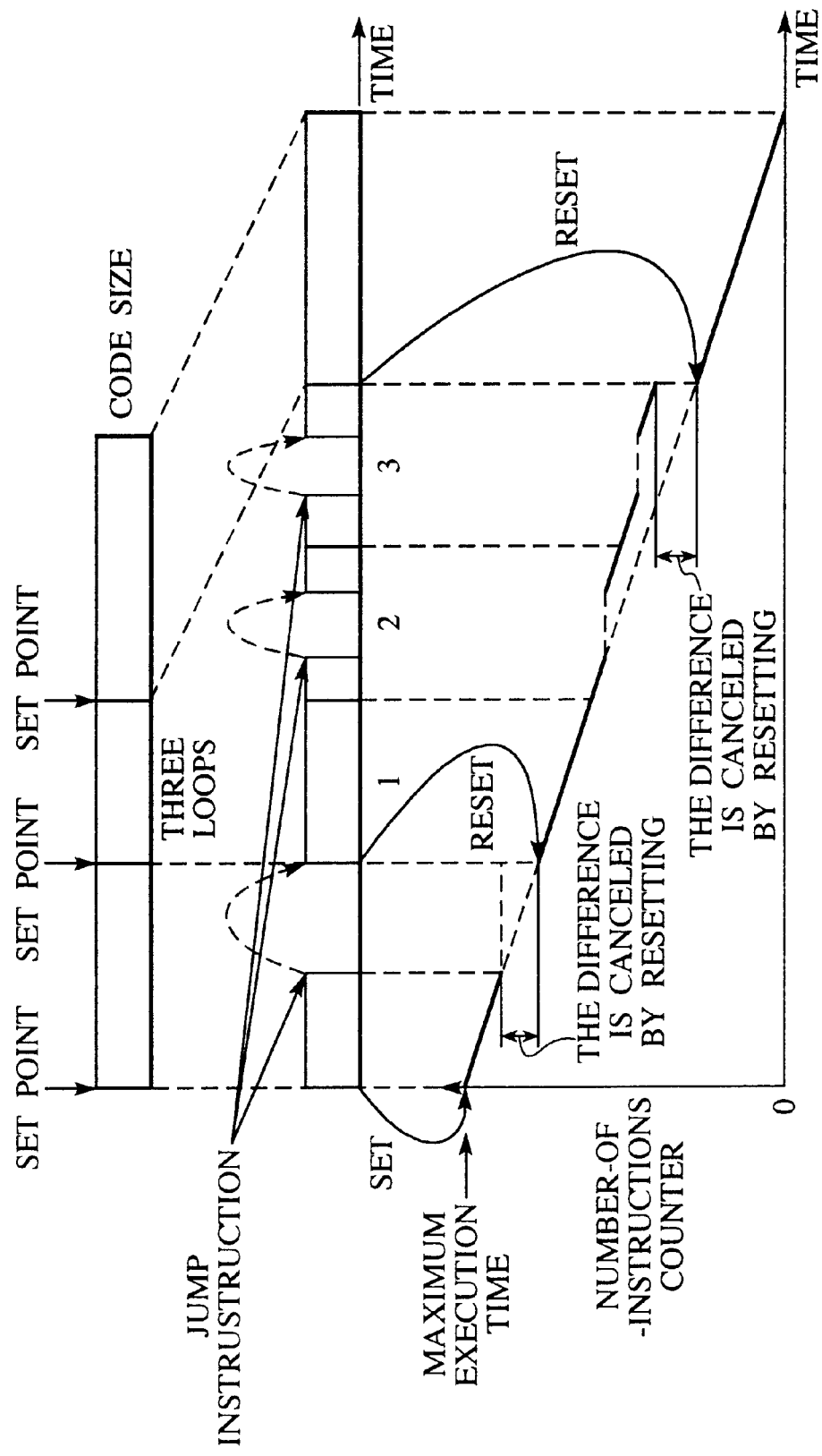

FIGS. 9, 10A, and 10B are diagrams showing the configuration and the operation of the number-of-instructions counter of an embodiment according to this invention. The embodiment shown in FIG. 9 is characterized in that the value of a number-of-instructions counter 8 may be reset at any point during execution of the program in the auxiliary processing unit 3. The program in the auxiliary processing unit 3 may contain coding which is sometimes skipped and canceled by a jump instruction under a certain condition. Therefore, when program execution is canceled by a jump instruction and so on, the number-of-instructions counter 8 should be decremented by the number of canceled instructions. In this case, however, the number-of-instructions counter 8 is decrement not by the number of canceled instructions but by 1, because it is designed to be decremented by 1 each time an instruction is executed. This means that the number-of-instructions counter 8 does not indicate the precise remaining amount of processing. Thus, in this embodiment, the number-of-instructions counter 8 is reset during execution of the program to reduce the difference between the value of the number-of-instructions counter 8 and the actual remaining amount of processing.

FIG. 10A shows how the value of the number-of-instructions counter 8 changes in the embodiment shown in FIG. 8 during execution of a program containing a plurality of jump instructions. As shown in FIG. 10A, the number-of-instructions counter is not decremented by the number of skipped instructions. As a result, the central processing unit 2 considers as if there was more processing than the actual amount of processing, and cannot make a correct schedule. To enable the central processing unit 2 to make a correct schedule, it is necessary for the program executed in the auxiliary processing unit 3 to reset the value of the number-of-instructions counter 8. FIG. 10B shows how the number-of-instructions counter 8 changes when the number of remaining instructions is reset immediately before and after a loop. The method used in this embodiment decreases the difference between the value of the number-of-instructions counter 8 and the actual number of remaining instructions, which is generated each time a jump instruction is executed, allowing the central processing unit 2 to make a correct schedule.

As described above, the system and the method according to this invention schedule the start time of a following process by considering the progress status of a preceding process as well as the processing time and the end time of the following process. Therefore, this scheduling system and method make it possible to process the following process much more efficiently than with the conventional system and method which schedule processes in a fixed manner, thus reducing the processing amount and processing time.

It should be understood that many modifications and adaptations of the invention will become apparent to those skilled in the art and it is intended to encompass such obvious modifications and changes in the scope of the claims appended hereto.

What is claimed is:

1. A data processing system comprising:

a central processing unit; and an auxiliary processing unit which runs in parallel with said central processing unit and which executes a special process according to a schedule made by said central processing unit, wherein said auxiliary processing unit comprises:

a progress status indicating unit for indicating a progress status of the special process being executed therein; and an operation status indicating unit for indicating an operation status thereof, and wherein said central processing unit comprises:

a database which stores a predetermined execution processing time of each special process; and a scheduling unit, responsive to a new process request received when said operation status indicating unit indicates that a preceding special process is being executed in said auxiliary processing unit and the new special process is higher in priority than the preceding special process, for selecting any one of ending the preceding special process, interrupting the preceding special process and saving a processing status, and interrupting the preceding special process and discarding the processing status, based on first to fourth times, thereby to schedule a time at which the new special process is to start, the first time being time from the moment the new process request is received to the moment the new special process must be ended, the second time being the processing time of the new special process, the processing time being stored in said database, the third time being time required for the preceding special process to end and obtained by referencing the progress status indicating unit of said auxiliary processing unit, and the fourth time being time required to interrupt the preceding special process being executed in said auxiliary processing unit and to save or discard the processing status thereof.

2. A data processing system comprising:

a central processing unit; and an auxiliary processing unit which runs in parallel with said central processing unit and which executes a special process according to a schedule made by said central processing unit, wherein said auxiliary processing unit comprises:

a progress status indicating unit for indicating a progress status of the special process being executed therein; and an operation status indicating unit for indicating an operation status thereof, and wherein said central processing unit comprises:

a database which stores a predetermined execution processing time of each special process; and a scheduling unit, responsive to a request received when said operation status indicating unit indicates that a preceding special process is being executed in said auxiliary processing unit and the new special process is higher in priority than the preceding special process, for calculating a limit time, Ta, from the moment the new process request is received to the moment the new special process must be ended, retrieving the processing time, Tb, of the new special process from said database, calculating a latest start time, Tc, before which the new special process must be started to complete within the limit time by subtracting the processing time Tb from the limit time Ta, and calculating a time, Td, when the preceding special process is to end by referencing the progress status indicating unit of said auxiliary processing unit, wherein the new special process is scheduled to start after the preceding special process is ended if $Tc \geq Td$, wherein the preceding special process is interrupted, the processing status is saved, and then the new special process is scheduled to start if $Tc < Td$ and $Tc \geq Te$, and wherein the preceding special process is interrupted, the processing status is discarded, and then the new special process is scheduled to start if $Tc < Td$, $Tc < Te$, and $Tc \geq Tf$, Te being a time at which the processing status of the interrupted preceding special process in said auxiliary processing unit is saved, Tf being a time at which the processing status of the interrupted preceding special process in said auxiliary processing unit is discarded.

3. A data processing system according to claim 1, wherein said progress status indicating unit is initialized to 0 when the special process is started and comprises a counter which is incremented by the number of instructions executed as the special process progresses.

4. A data processing system according to claim 2, wherein said progress status indicating unit is initialized to 0 when the special process is started and comprises a counter which is incremented by the number of instructions executed as the special process progresses.

5. A data processing system according to claim 1, wherein said progress status indicating unit is set to the time required to execute the special process when the auxiliary processing unit starts the special process and comprises a counter which is decremented by the number of instructions executed as the special process progresses.

6. A data processing system according to claim 2, wherein said progress status indicating unit is set to the time required to execute the special process when the auxiliary processing unit starts the special process and comprises a counter which is decremented by the number of instructions executed as the special process progresses.

7. A data processing system according to claim 5, wherein the value of said counter is reset according to the content of processing at any time during the special processing.

8. A data processing system according to claim 6, wherein the value of said counter is reset according to the content of processing at any time during the special processing.

9. A scheduling method for allowing a central processing unit to schedule special processes to be executed in an auxiliary processing unit, in response to a new special process request received by said central processing unit when a preceding special process is being executed in said auxiliary processing unit and the new special process is higher in priority than the preceding special process, comprising the steps of:

selecting any one of ending the preceding special process, interrupting the preceding special process and saving a processing status thereof, and interrupting the preceding special process and discarding the processing status, based on first to fourth times, the first time being time from the moment the new process request is received to the moment the new special process must be ended, the second time being a processing time of the new special process, the third time being time from the moment the request is received to the moment the preceding special process is to end, and the fourth time being time required to interrupt the preceding special process being executed in said auxiliary processing unit and to save or discard the processing status thereof; and scheduling a time at which the new special process is to start.

10. A scheduling method for allowing a central processing unit to schedule special processes to be executed in an auxiliary processing unit, in response to a new special process request received by said central processing unit when a preceding special process is being executed in said auxiliary processing unit and the new special process is higher in priority than the preceding special process, comprising the steps of:

calculating a limit time, Ta, from the moment the new process request is received to the moment the new special process must be ended;

retrieving a processing time, Tb, of the new special process and calculating a latest start time, Tc, before which the new special process must be started to complete within the limit time by subtracting the processing time Tb from the limit time Ta;

calculating a time, Td, when the preceding special process is to end;

starting the new special process after the preceding special process is ended if Tc≧Td;

interrupting the preceding special process, saving the processing status, and then starting the new special process if Tc<Td and Tc≧Te, Te being a time at which the processing status of the interrupted preceding special process in said auxiliary processing unit is saved; and interrupting the preceding special process, discarding the processing status, and then starting the new special process if Tc<Td, Tc<Te, and Tc≧Tf, Tf being a time at which the processing status of the interrupted preceding special process in said auxiliary processing unit is discarded.

11. A data processing system comprising:

a central processing unit; and an auxiliary processing unit which runs in parallel with said central processing unit and which executes a special process according to a schedule made by said central processing unit, wherein said auxiliary processing unit comprises:
a number-of-instructions counter that indicates a progress status of the special process being executed therein; and
an operation status register that indicates an operation status thereof, and wherein said central processing unit comprises:
a database which stores a predetermined execution processing time of each special process; and
a scheduling unit, responsive to a new process request received when said operation status register indicates that a preceding special process is being executed in said auxiliary processing unit and the new special process is higher in priority than the preceding special process, for selecting any one of (i) ending the preceding special process, (ii) interrupting the preceding special process and saving a processing status, and (iii) interrupting the preceding special process and discarding the processing status, and scheduling a time at which the new special process is to start, wherein the scheduling unit selects based on (a) a limit time from the moment the new process request is received to the moment the new special process must be ended, (b) a processing time of the new special process, said processing time being stored in said database, (c) a time required for the preceding special process to end, said time being obtained by referencing the number-of-instructions counter, and (d) a time required to interrupt the preceding special process being executed in said auxiliary processing unit, and to save or discard the processing status.

* * * * *